United States Patent
Zhang et al.

(10) Patent No.: US 9,651,763 B2
(45) Date of Patent: May 16, 2017

(54) CO-APERTURE BROADBAND INFRARED OPTICAL SYSTEM

(71) Applicant: HUAZHONG UNIVERSITY OF SCIENCE AND TECHNOLOGY, Wuhan, Hubei (CN)

(72) Inventors: Hong Zhang, Hubei (CN); Jindong Fei, Hubei (CN); Tlanxu Zhang, Hubei (CN); Xiaobing Dai, Hubei (CN); Xlangyan Liu, Hubei (CN); Li Liu, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/106,699

(22) PCT Filed: Feb. 10, 2015

(86) PCT No.: PCT/CN2015/072666
§ 371 (c)(1),
(2) Date: Jun. 20, 2016

(87) PCT Pub. No.: WO2016/106952
PCT Pub. Date: Jul. 7, 2016

(65) Prior Publication Data
US 2016/0370562 A1    Dec. 22, 2016

(30) Foreign Application Priority Data

Dec. 30, 2014  (CN) .......................... 2014 1 0844556

(51) Int. Cl.
*G02B 13/14* (2006.01)
*G02B 17/08* (2006.01)
(Continued)

(52) U.S. Cl.
CPC ........ *G02B 17/0808* (2013.01); *G01J 3/2823* (2013.01); *G02B 1/11* (2013.01);
(Continued)

(58) Field of Classification Search
CPC .......... G01J 3/02; G01J 3/2823; G01V 8/005; G02B 17/0808; G02B 13/14
See application file for complete search history.

(56) References Cited

U.S. PATENT DOCUMENTS 7,049,597 B2 * 5/2006 Bodkin ..................... G01J 3/02
                                                250/336.1
2004/0184163 A1 * 9/2004 Nishioka ............ G02B 13/0045
                                                359/726

FOREIGN PATENT DOCUMENTS

CN        102116673        7/2011
CN        102385158        3/2012
(Continued)

OTHER PUBLICATIONS

X. Liu et al., "An Infrared Scanning and Tracking System for Detecting Mid-Wave Infrared Spectral Characteristics of Moving Targets," Applied Spectroscopy, vol. 68, No. 11 (2014), p. 1289-1295.
(Continued)

*Primary Examiner* — David Porta
*Assistant Examiner* — Faye Boosalis
(74) *Attorney, Agent, or Firm* — Hamre, Schumann, Mueller & Larson, P.C.

(57) ABSTRACT

The present invention discloses a co-aperture broadband infrared optical system, belonging to the field of infrared optical system. The system realizes long wave infrared (LWIR) imaging and broadband infrared spectrum measurement, and solves the problems of limited optical path layout, large volume and high cost of an optical system. The present
(Continued)

invention includes a Cassegrain lens, a spectroscope, a reflector, several lens groups, an FPA interface and an optical fiber interface. Light (2 μm~12 μm) is incident to the Cassegrain lens to be focused, then is split by the spectroscope, where 50% of the LWIR light (8 μm~10 μm) passes through the lens group for aberration correction, and the image plane is focused again at the imaging interface. The other 50% of the LWIR light (8 μm~10 μm) and the infrared reflected light (2 μm~8 μm and 10 μm~12 μm) pass through the lens group, and are reflected by the reflector, then focused at the optical fiber interface. The present invention is compact in overall structure and convenient and flexible to use, has relatively low cost, and can be integrated into an image-spectrum associated detection device to implement automatic detection and tracking, which can be widely used in civil and military fields such as environmental monitoring and infrared guidance.

5 Claims, 5 Drawing Sheets

(51) Int. Cl.
    *G02B 7/182*    (2006.01)
    *G01J 3/28*    (2006.01)
    *G02B 1/11*    (2015.01)
    *G02B 27/00*    (2006.01)
    *G02B 27/14*    (2006.01)
(52) U.S. Cl.
    CPC ............ *G02B 7/182* (2013.01); *G02B 13/146* (2013.01); *G02B 27/0025* (2013.01); *G02B 27/142* (2013.01)

(56) References Cited

FOREIGN PATENT DOCUMENTS

| | | |
|---|---|---|
| CN | 103743719 | 4/2014 |
| CN | 103776540 | 5/2014 |
| CN | 203799103 | 8/2014 |

OTHER PUBLICATIONS

International Search Report for international application No. PCT/CN2015/072666, dated Sep. 24, 2015 (3 pages, including English translation.)

* cited by examiner

CO-APERTURE BROADBAND INFRARED OPTICAL SYSTEM

TECHNICAL FIELD

The present invention relates to the field of infrared optical systems, and in particular, to a co-aperture broadband infrared optical system.

BACKGROUND ART

As the development trend of modern remote sensing technology, image-spectrum associated detection is a great progress of remote sensing technology in the late period of the last century, also is the leading technology in the field of remote sensing. According to structure and characteristics of an electromagnetic spectrum, target infrared information refers to the difference of characteristics of radiation, reflection and scattering between a target acquired by an infrared band sensor and a background, which includes the characteristics of radiation, reflection and scattering in respective fine spectrum (light) bands of short wave infrared (SWIR), mid-wave infrared (MWIR), long-wave infrared (LWIR). The co-aperture broadband infrared optical system can simultaneously obtain the radiation energy of the SWIR, MWIR and LWIR, therefore there is a qualitative leap in improving detection precision and capability of detection and identification. With the rapid development of infrared photoelectric technology, the simultaneous detection on the radiation in a broadband range becomes very important, leading to an unprecedented growth of requirements on corresponding optical system and its design.

The co-aperture broadband infrared optical system is mainly characterized in: (1) "co-aperture" refers to that the LWIR imaging shares an aperture with the broadband infrared spectrum measurement, so that the target radiation can be fully utilized and meanwhile a high image-spectrum association precision can be achieved. (2) "Broadband" refers to that the range of system wave band is wide, which relates to short, medium and long waves, and the specific coverage is 2 μm-12 μm. However, because there are various limitations on infrared materials, processing ability, coating technology and the like in China, especially implementing broadband co-aperture in the case of not using special components or special materials while correcting various aberrations simultaneously, there is a huge challenge on design of the co-aperture broadband infrared optical system. Further, remote sensing infrared optical systems mostly work in a harsh environment temperature range, the thermal refractive index coefficient of the infrared optical material is large, and therefore, the environment temperature change may cause thermal defocusing of the infrared optical system and lead to degradation of image quality.

The infrared optical lens disclosed in the prior art is dual-band (medium wave and long wave), and is essentially assembled by 2 lenses: a mid-wave one and a long wave one; thereby having large volume and weight, and belonging to the coverage of a regular band.

SUMMARY

In order to overcome the problems of the infrared dual-band lens in the prior art such as narrow range of band, limited system optical path layout, and large volume and weight, the present invention provides a co-aperture broadband infrared optical system, directed to implement a band response range covering the short, medium and long waves (2 μm-12 μm), and co-aperture of optical paths of imaging and spectral measurement, thereby solving the technical problems of the optical system layout optimization.

The present invention provides a co-aperture broadband infrared optical system, including: a Cassegrain lens, a first lens group, a spectroscope, a second lens group, an imaging interface, a third lens group, a reflector, a fourth lens group, and an optical fiber interface. The first lens group is located at the exit optical path of the Cassegrain lens and arranged coaxially with the Cassegrain lens; a center of a mirror plane of the spectroscope coincides with the central axis, and the mirror plane of the spectroscope is arranged to form an angle of 45° with the central axis; the second lens group is located at the transmission optical path of the spectroscope; the imaging interface is located at the tail of the second lens group, and the exit pupil of the second lens group coincides with an interface surface of the imaging interface, for arranging an imaging component; the third lens group is located at the reflection optical path of the spectroscope; the center of the mirror plane of the reflector coincides with the central axis of the third lens group, and the mirror plane of the reflector is arranged to form an angle of 45° with the central axis, keeping parallel with the spectroscope; the fourth lens group is located at the reflection optical path of the reflector; and the optical fiber interface is arranged at the rear of the fourth lens group, and an end surface of the optical fiber interface coincides with the exit pupil of the fourth lens group.

Further, the Cassegrain lens includes a primary mirror and a secondary mirror, and the obscuration ratio of the primary mirror and the secondary mirror is not greater than 1:3.

Further, the first lens group comprises a crescent convex lens and a planoconvex lens sequentially arranged coaxially at the central optical axis, for performing aberration correction and chromatic aberration correction on the infrared light focused by the Cassegrain lens.

Further, a first mirror plane of the spectroscope is coated with beam splitting film, and a second mirror plane is coated with a long-wave antireflection film.

Further, the second lens group comprises a first concave lens, a second concave lens, a first planoconvex lens, a third concave lens and a second planoconvex lens that are disposed sequentially and coaxially.

Further, the third lens group comprises a concave lens, a planoconvex lens and another concave lens that are disposed sequentially and coaxially.

Further, the fourth lens group comprises a crescent convex lens, a planoconvex lens and another planoconvex lens that are disposed sequentially and coaxially.

In general, compared with the prior art, in the technical scheme conceived by the present invention, the reflected light of the primary mirror and the secondary mirror in the Cassegrain lens forms a folded optical path, which effectively reduces the volume of the overall structure of the system, and a smaller obscuration ratio can also help improving the transmittance of the optical system; the optimized combination of the lens groups corrects the chromatic aberration of position, chromatic aberration of magnification, and on-axis and off-axis monochromatic aberrations of the system; the spectroscope adopts a multilayer film structure, which has high reflectivity on short and medium-wave infrared light, but has a semi-reflecting and semi-transmitting function on the long wave infrared light; and the whole system adopts a refracting-reflecting structure, thereby implementing co-aperture of the broadband imaging and the spectrum measurement, and two field-of-view (FOV) centers are overlapped.

where, 1 is the Cassegrain lens, 11 is the primary mirror, 12 is the secondary mirror, 2 is the first lens group, 3 is the spectroscope, 4 is the second lens group, 5 is the imaging interface, 6 is the third lens group, 7 is the reflector, 8 is the fourth lens group, and 9 is the optical fiber interface.

DETAILED DESCRIPTION

In order to make the objectives, the technical solutions and the advantages of the present invention clearer and understandable, details of the present invention are further described below through the accompanying drawings and embodiments. It should be noted that the described embodiments herein are merely used to explain the present invention and are not intended to limit the present invention. In addition, the technical features involved in the various embodiments of the present invention described below can be combined with each other if there is no conflict involved.

The co-aperture broadband infrared optical system according to an embodiment of the present invention may be used as an infrared optical component of an image-spectrum associated detection system, for LWIR imaging and broadband infrared spectrum measurement.

Figure 1:
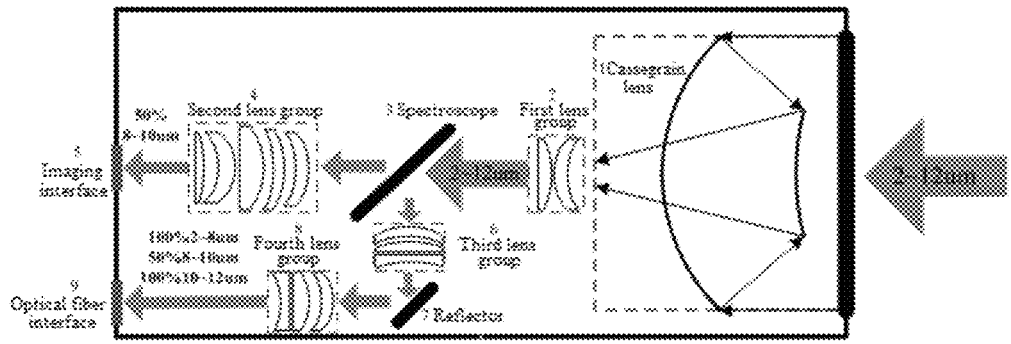
FIG. 1 is a schematic structural diagram of a co-aperture broadband infrared optical system according to an embodiment of the present invention.

The present invention provides a co-aperture broadband infrared optical system, and a schematic structural diagram of the co-aperture broadband infrared optical system is shown in FIG. 1. The system includes a Cassegrain lens 1, a first lens group 2, a spectroscope 3, a second lens group 4, an imaging interface 5, a third lens group 6, a reflector 7, a fourth lens group 8 and an optical fiber interface 9. A central axis of the Cassegrain lens 1 coincides with a system central axis. The first lens group 2 is located at the exit optical path of the Cassegrain lens 1 and arranged coaxially. A center of a mirror plane of the spectroscope 3 coincides with the system central axis, and the mirror plane is arranged to form an angle of 45° with the central axis. The second lens group 4 follows the spectroscope 3, and is arranged in the transmission optical path of the spectroscope 3. The imaging interface 5 is located at the tail of the second lens group 4, and the exit pupil of the second lens group 4 coincides with the interface surface of the imaging interface 5, for arranging an imaging component. The third lens group 6 follows the spectroscope 3, and is located at the reflection optical path of the spectroscope 3. The center of the mirror plane of the reflector 7 coincides with the central axis of the third lens group 6, and the mirror plane is arranged to form an angle of 45° with the central axis, keeping parallel with the spectroscope 3. The fourth lens group 8 is located at the reflection optical path of the reflector 7. The optical fiber interface 9 is arranged at the rear of the fourth lens group 8, and an end surface thereof coincides with an exit pupil of the fourth lens group 8. The overall structure of the system can use lightweight aluminum alloy to reduce the system weight, and meanwhile setting up a necessary thin-wall lens hood can also be considered to minimize the interference of the background and sunlight.

Figure 2:
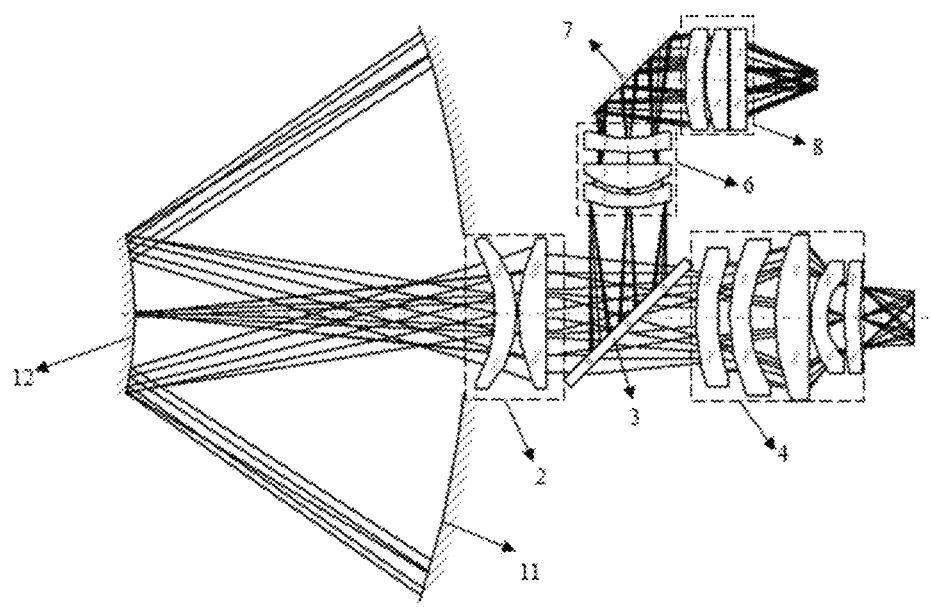
FIG. 2 is a schematic layout diagram of a co-aperture broadband infrared optical system according to an embodiment of the present invention.

As shown in FIG. 2, the light (2 μm-12 μm) is incident to the primary mirror 11 of the Cassegrain lens 1, reflected to the secondary mirror 12 then reflected again, and the reflected light passes through the first lens group 2 to be focused, and then enters the spectroscope 3 to be split. The primary mirror 11, the secondary mirror 12, the first lens group 2 and the spectroscope 3 shares the common aperture. After the splitting, 50% of the LWIR light (8 μm-10 μm) transmitted from the spectroscope 3 enters the lens group 4 for aberration correction, and then the image plane is focused again at the imaging interface. Besides, the other 50% of the LWIR light (8 μm-10 μm) and the 2 μm-8 μm and 10 μm-12 μm infrared light reflected by the spectroscope 3 pass through the third lens group 6, are re-reflected by the reflector 7, and then pass through the fourth lens group 8 and are focused at the optical fiber interface.

Figure 3:
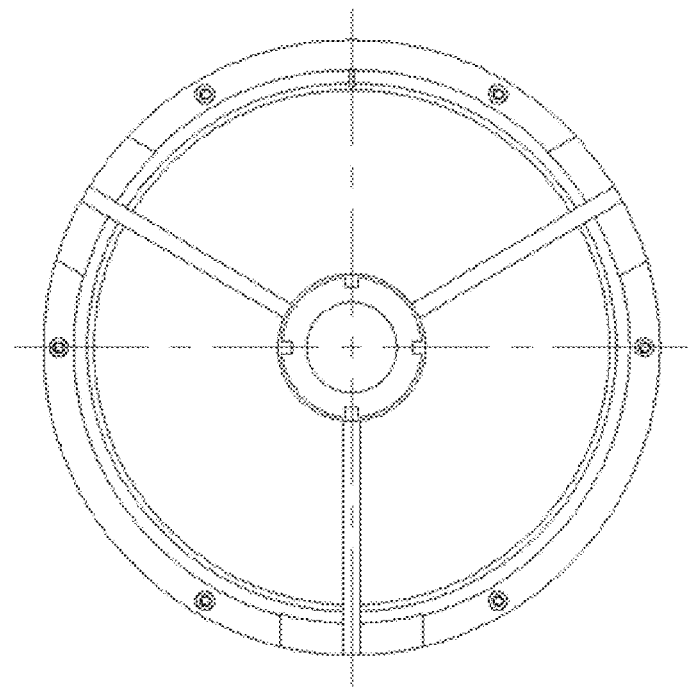
FIG. 3 is a front view of a Cassegrain lens in a co-aperture broadband infrared optical system according to an embodiment of the present invention.

The Cassegrain lens 1 includes the primary mirror 11 and the secondary mirror 12, both of which can use a high-order non-spherical reflector, and the obscuration ratio of the primary mirror and the secondary mirror is designed to not greater than 1:3 (as shown in FIG. 3). The high-order non-spherical surfaces of the primary and secondary mirrors undertake the monochromatic aberration on the main axis of the co-aperture broadband infrared optical system. As a reflector, the primary mirror or the secondary mirror does not produce chromatic aberration, which is in favor of the optical system imaging in a large infrared spectrum band range. Besides, the Cassegrain reflection system folds the optical path, and compresses the optical tube length. On the premise of ensuring a reasonable space needed for the imaging of the primary and the secondary mirrors, a smaller obscuration ratio can help improving the transmittance of the optical system.

The first lens group 2 is used for performing aberration correction and chromatic aberration correction on the infrared light focused by the Cassegrain lens 1 and then outputting the light; and includes two convex lenses, where a crescent convex lens is located at the front, followed by a planoconvex lens arranged coaxially. By using the CVD zinc selenide material through which infrared broadband spectrum can pass and setting a diffractive optical surface, the chromatic aberration produced by the wide band range in broadband spectrum imaging can be partly balanced, and the off-axis monochromatic aberration and part of the chromatic aberration in long wave imaging can also be consumed. The axle center of the first lens group 2 coincides with the central axis of the Cassegrain lens 1, and the lens group should be set as closely as possible to the Cassegrain lens 1 to prevent the lens structure from blocking the light between the primary and the secondary mirrors.

A center of a mirror plane of the spectroscope 3 coincides with the central axis of the Cassegrain lens 1, and the mirror plane is arranged to form an angle of 45° with the central axis. First of all, the film design, the coating of beam splitting film (the first surface) and long-wave antireflection film (the second surface) should be performed on the basis that the infrared light is incident at an angle of 45°. Secondly, the spectroscope 3 may cause minor deviation of the transmission optical axis, making the long wave refrigeration imaging system being an off-axis optical system, which will cause the aberrations in meridian and sagittal directions be asymmetrical, and deteriorate the meridian aberration. In an optimized optical design, it is needed to control field curvature and astigmatism, to balance the meridian and sagittal aberrations.

The second lens group 4 follows the spectroscope 3 and is located at the transmission optical path of the spectroscope 3, mainly used for the LWIR imaging. It is formed by five lenses, two concave lenses are arranged successively in the front, and a planoconvex lens is located therebetween, followed by a concave lens arranged closely, and finally a planoconvex lens is coaxially arranged. The second lens group 4 coordinates with the first lens group 2 to eliminate the imaging chromatic aberration. The non-spherical lens group can reduce the number of lenses, thereby simplifying the structure, and improving the spectrum transmittance.

The third lens group 6 follows the spectroscope 3, and is arranged at the reflection optical path of the spectroscope 3, for cooperating with the reflector 7 and the fourth lens group 8 for broadband spectrum imaging, thereby optimizing the broadband spectrum chromatic aberration. It is formed by three lenses, a concave lens is located at the front, and a planoconvex lens is located at the middle, followed by the other concave lens coaxially arranged.

The center of the mirror plane of the reflector 7 coincides with the central axis of the third lens group 6, and the mirror plane is arranged to form an angle of 45° with the central axis, keeping parallel with the spectroscope 3, for the purpose of refolding the optical path, and making the broadband spectrum imaging optical axis be parallel with the LWIR imaging optical axis, which is conducive to the structure layout of the whole co-aperture broadband infrared optical system.

The fourth lens group 8 is located at the reflection optical path of the reflector 7, for cooperating with the third lens group 6 to correct the chromatic aberration of position and chromatic aberration of magnification in the broadband spectrum imaging. It includes three lenses, where, a crescent convex lens is located at the front, followed by two planoconvex lenses arranged closely.

The imaging interface 5 and the optical fiber interface 9 can use a self-designed interface according to the specific infrared detector and the chosen optical fiber.

An entrance pupil of the co-aperture broadband infrared optical system is located on the primary mirror 11, and an exit pupil is designed to be on the last lens of the first lens group 4, so as to compress the caliber of the primary mirror, and reduce the volume and weight, and can effectively reduce the radiation interference from the background and the tube itself.

The co-aperture broadband infrared optical system adopts athermalisation, thus when the environment temperature changes in the range from −40° C. to +60° C., the position of the imaging plane of the system keeps stable, and the focusing structure can be omitted.

Figure 4:
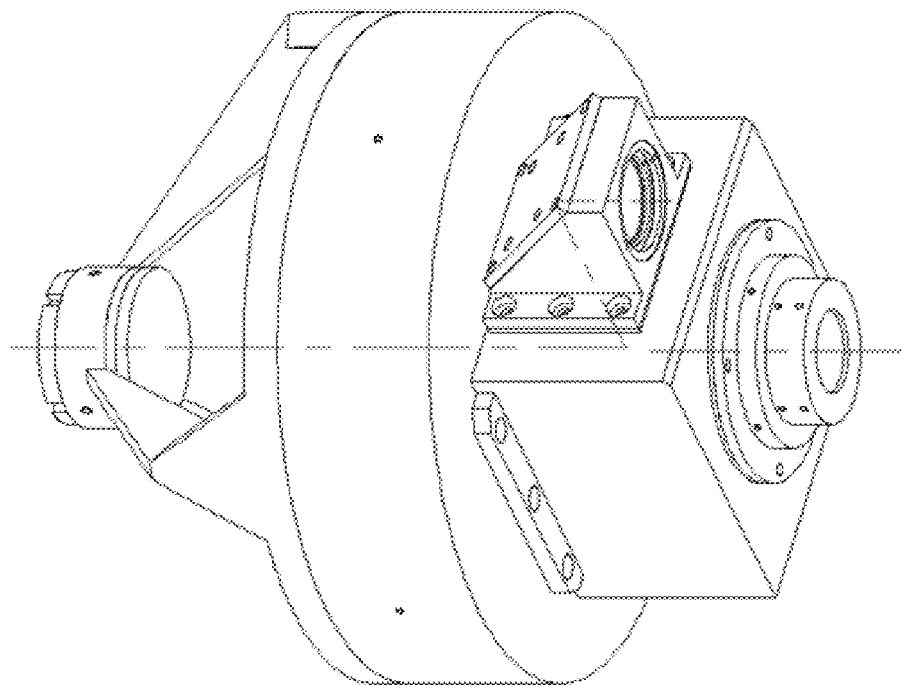
FIG. 4 is a configuration structural diagram of a co-aperture broadband infrared optical system according to an embodiment of the present invention.

In the co-aperture broadband infrared optical system, the FOV angle is 2°×1.6° (diagonals on angle of 2.5°), the clear aperture is 138 mm, the focal length of the LWIR imaging is 275 mm, the focal length of the broadband spectrum imaging is 285 mm, the response wave band is 2~12 μm (broadband), the system volume is 180 mm (height)×170 mm (width)×200 mm (length), and the weight is 4.5 kg, and the configuration structure is shown in FIG. 4.

The co-aperture broadband infrared optical system has small volume, high integration, and wide range of response wave band, meanwhile it realizes the co-aperture of the LWIR imaging and the broadband spectrum. It can be integrated into an image-spectrum associated detection device to implement FOV scanning, automatic detection and tracking, which can be widely used in civil and military fields such as environmental monitoring and infrared guidance.

Figure 5A:
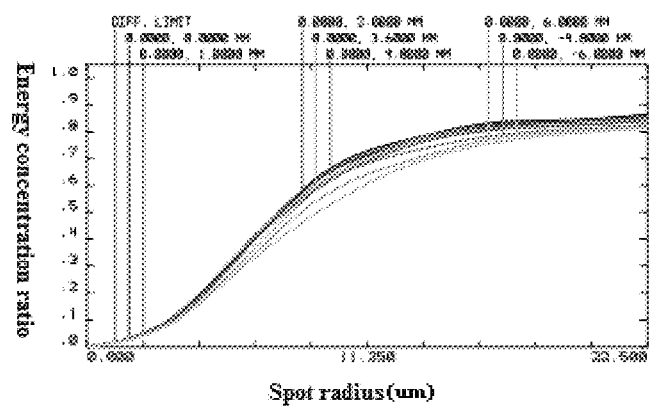
FIG. 5(a) shows an energy concentration ratio of imaging quality of an optical system, in an imaging area of 45 μm×45 μm.
Figure 5B:
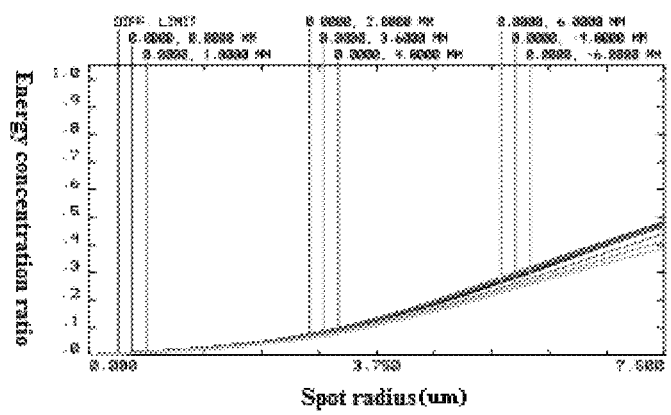
FIG. 5(b) shows an energy concentration ratio of imaging quality of an optical system, in an imaging area of 15 μm×15 μm.

The imaging quality of an optical system is mainly evaluated according to the energy concentration ratio, the spot diagram and the field curvature and distortion curve. FIG. 5(a) and FIG. 5(b) respectively show energy concentration ratio curves of long wave imaging in the embodiments of the present invention in different FOVs and different areas, and details are shown in the table below.

| Diffraction Limit | 0° | 1.5° | 2° | 2.5° |
|---|---|---|---|---|
| | 45 μm × 45 μm Area | | | |
| 86.4% | 85.8% | 84.6% | 84.0% | 81.5% |
| | 15 μm × 15 μm Area | | | |
| 48.0% | 47.2% | 46.6% | 46.5% | 38.7% |

Figure 5C:
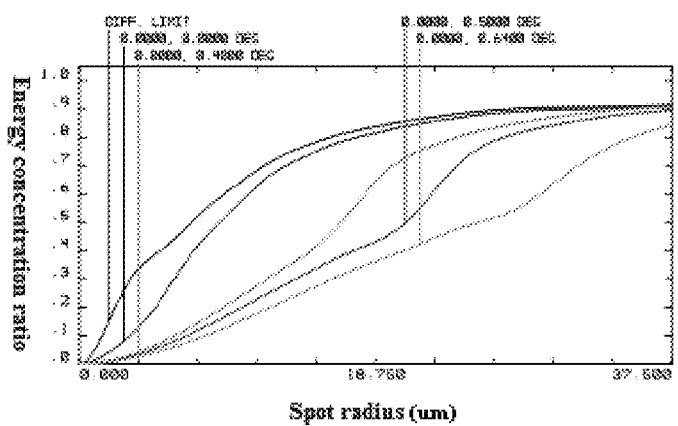
FIG. 5(c) shows an energy concentration ratio of imaging quality of an optical system, in a spectrum area of 75 μm×75 μm.
Figure 5D:
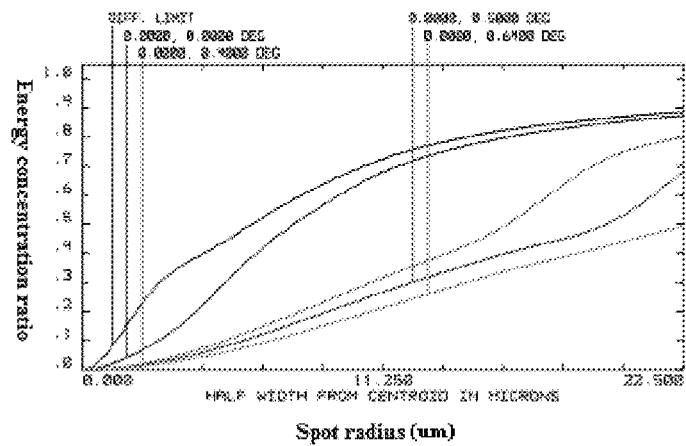
FIG. 5(d) shows an energy concentration ratio of imaging quality of an optical system, in a spectrum area of 45 μm×45 μm.

FIG. 5(c) and FIG. 5(d) respectively show energy concentration ratio curves of broadband spectrum imaging in the embodiments of the present invention in different FOVs and different areas, and details are shown in the table below.

| Diffraction Limit | 0° | 0.8° | 1° | 1.28° |
|---|---|---|---|---|
| | 75 μm × 75 μm Area | | | |
| 93.0% | 92.7% | 91.6% | 90.6% | 87.6% |
| | 45 μm × 45 μm Area | | | |
| 88.6% | 87.3% | 80.2% | 68.0% | 49.1% |

Figure 6A:
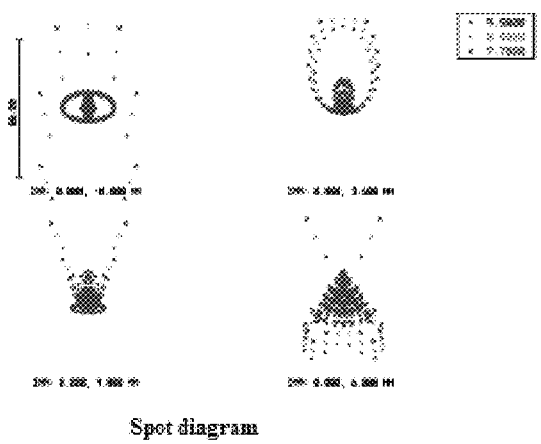
FIG. 6(a) is a imaging spot diagram of imaging quality of an optical system.
Figure 6B:
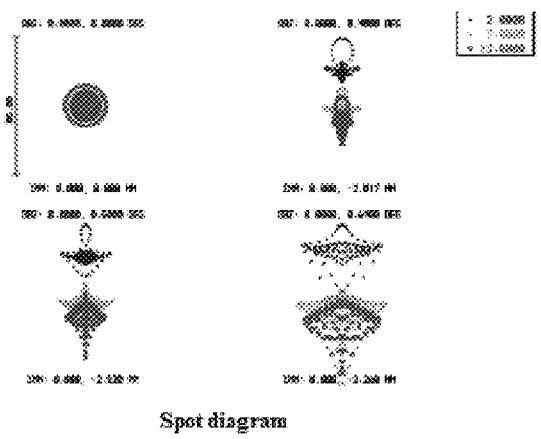
FIG. 6(b) is a spectrum spot diagram of imaging quality of an optical system.

FIG. 6(a) reflects a spot diagram of the LWIR imaging in the embodiments of the present invention, and FIG. 6(b) reflects a spot diagram of the broadband spectrum imaging in the embodiments of the present invention.

Figure 7A:
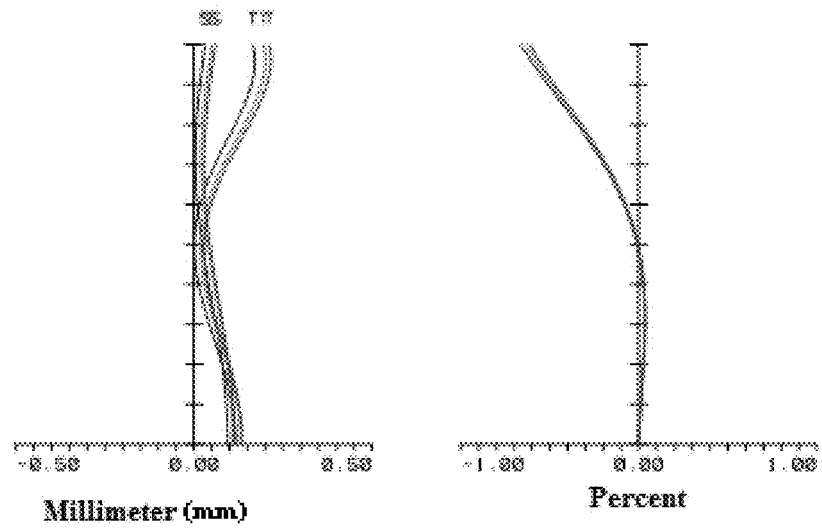
FIG. 7(a) shows a field curvature and distortion curve (imaging) of imaging quality of an optical system.

FIG. 7(a) reflects a field curvature and distortion curve of LWIR imaging in the embodiments of the present invention, where, the field curvature of the whole FOV is not greater than 0.22 mm, the distortion is no less than −0.66%, and detail data is shown in the table below.

| FOV | 0° | 1.5° | 2° | 2.5° |
|---|---|---|---|---|
| Field curvature (mm) | 0 | 0.05 | 0.15 | 0.21 |
| Distortion (%) | 0 | 0.09 | −0.34 | −0.66 |

Figure 7B:
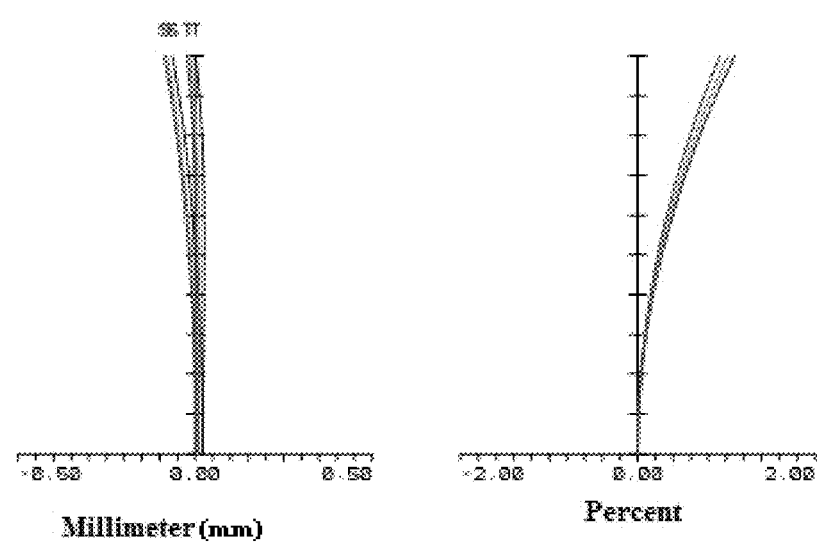
FIG. 7(b) shows a field curvature and distortion curve (spectrum) of imaging quality of an optical system.

FIG. 7(b) reflects a field curvature and distortion curve of the broadband spectrum imaging in the embodiments of the present invention, where, the field curvature of the whole FOV is not greater than 0.22 mm, the distortion is no less than −0.66%, and detail data is shown in the table below.

| FOV | 0° | 0.8° | 1° | 1.28° |
|---|---|---|---|---|
| Field curvature (mm) | 0 | 0.07 | 0.09 | 0.10 |
| Distortion (%) | 0 | +0.7 | +1.1 | +1.8 |

It is easily understood by a person skilled in the art that, the above descriptions are only preferred embodiments of the present invention, and are not intended to limit the present invention; and any modification, equivalent replacement and improvement made without departing from the spirit and principle of the present invention shall all fall within the protection scope of the preset invention.

The invention claimed is:

1. A co-aperture broadband infrared optical system, comprising:
   a Cassegrain lens;
   a first lens group;
   a spectroscope;
   a second lens group;
   an imaging interface;
   a third lens group;
   a reflector;
   a fourth lens group; and
   an optical fiber interface,
   wherein the first lens group is located at an exit optical path of the Cassegrain lens and arranged coaxially with the Cassegrain lens;
      a center of a mirror plane of the spectroscope coincides with a central axis, and the mirror plane of the spectroscope is arranged to form an angle of 45° with the central axis;
      the second lens group is located at a transmission optical path of the spectroscope;
      the imaging interface is located at a tail of the second lens group, and an exit pupil of the second lens group coincides with an interface surface of the imaging interface, for arranging an imaging component;
      the third lens group is located at a reflection optical path of the spectroscope;
      a center of the mirror plane of the reflector coincides with a central axis of the third lens group, and the mirror plane of the reflector is arranged to form an angle of 45° with the central axis, keeping parallel with the spectroscope;
      the fourth lens group is located at a reflection optical path of the reflector;
      the optical fiber interface is arranged at a rear of the fourth lens group, and an end surface of the optical fiber interface coincides with an exit pupil of the fourth lens group; and
      the Cassegrain lens comprises a primary mirror and a secondary mirror, an obscuration ratio of the primary mirror and the secondary mirror is not greater than 1:3.

2. A co-aperture broadband infrared optical system, comprising:
   a Cassegrain lens;
   a first lens group;
   a spectroscope;
   a second lens group;
   an imaging interface;
   a third lens group;
   a reflector;
   a fourth lens group; and
   an optical fiber interface,
   wherein the first lens group is located at an exit optical path of the Cassegrain lens and arranged coaxially with the Cassegrain lens;
      a center of a mirror plane of the spectroscope coincides with a central axis, and the mirror plane of the spectroscope is arranged to form an angle of 45° with the central axis;
      the second lens group is located at a transmission optical path of the spectroscope;
      the imaging interface is located at a tail of the second lens group, and an exit pupil of the second lens group coincides with an interface surface of the imaging interface, for arranging an imaging component;
      the third lens group is located at a reflection optical path of the spectroscope;
      a center of the mirror plane of the reflector coincides with a central axis of the third lens group, and the mirror plane of the reflector is arranged to form an angle of 45° with the central axis, keeping parallel with the spectroscope;
      the fourth lens group is located at a reflection optical path of the reflector;
      the optical fiber interface is arranged at a rear of the fourth lens group, and an end surface of the optical fiber interface coincides with an exit pupil of the fourth lens group; and
   the first lens group comprises a crescent convex lens and a planoconvex lens sequentially arranged coaxially at the central axis, for performing aberration correction and chromatic aberration correction on an infrared light focused by the Cassegrain lens.

3. A co-aperture broadband infrared optical system, comprising:
   a Cassegrain lens;
   a first lens group;
   a spectroscope;
   a second lens group;
   an imaging interface;
   a third lens group;
   a reflector;
   a fourth lens group; and
   an optical fiber interface,
   wherein the first lens group is located at an exit optical path of the Cassegrain lens and arranged coaxially with the Cassegrain lens;
      a center of a mirror plane of the spectroscope coincides with a central axis, and the mirror plane of the spectroscope is arranged to form an angle of 45° with the central axis;
      the second lens group is located at a transmission optical path of the spectroscope;
      the imaging interface is located at a tail of the second lens group, and an exit pupil of the second lens group coincides with an interface surface of the imaging interface, for arranging an imaging component;
      the third lens group is located at a reflection optical path of the spectroscope;
      a center of the mirror plane of the reflector coincides with a central axis of the third lens group, and the mirror plane of the reflector is arranged to form an angle of 45° with the central axis, keeping parallel with the spectroscope;
      the fourth lens group is located at a reflection optical path of the reflector;

the optical fiber interface is arranged at a rear of the fourth lens group, and an end surface of the optical fiber interface coincides with an exit pupil of the fourth lens group; and the second lens group comprises a first concave lens, a second concave lens, a first planoconvex lens, a third concave lens, and a second planoconvex lens that are disposed sequentially and coaxially.

4. A co-aperture broadband infrared optical system, comprising:
   a Cassegrain lens;
   a first lens group;
   a spectroscope;
   a second lens group;
   an imaging interface;
   a third lens group;
   a reflector;
   a fourth lens group; and
   an optical fiber interface,
   wherein the first lens group is located at an exit optical path of the Cassegrain lens and arranged coaxially with the Cassegrain lens;
     a center of a mirror plane of the spectroscope coincides with a central axis, and the mirror plane of the spectroscope is arranged to form an angle of 45° with the central axis;
     the second lens group is located at a transmission optical path of the spectroscope;
     the imaging interface is located at a tail of the second lens group, and an exit pupil of the second lens group coincides with an interface surface of the imaging interface, for arranging an imaging component;
     the third lens group is located at a reflection optical path of the spectroscope;
     a center of the mirror plane of the reflector coincides with a central axis of the third lens group, and the mirror plane of the reflector is arranged to form an angle of 45° with the central axis, keeping parallel with the spectroscope;
     the fourth lens group is located at a reflection optical path of the reflector;
     the optical fiber interface is arranged at a rear of the fourth lens group, and an end surface of the optical fiber interface coincides with an exit pupil of the fourth lens group; and the third lens group comprises a concave lens, a planoconvex lens, and another concave lens that are disposed sequentially and coaxially.

5. A co-aperture broadband infrared optical system, comprising:
   a Cassegrain lens;
   a first lens group;
   a spectroscope;
   a second lens group;
   an imaging interface;
   a third lens group;
   a reflector;
   a fourth lens group; and
   an optical fiber interface,
   wherein the first lens group is located at an exit optical path of the Cassegrain lens and arranged coaxially with the Cassegrain lens;
     a center of a mirror plane of the spectroscope coincides with a central axis, and the mirror plane of the spectroscope is arranged to form an angle of 45° with the central axis;
     the second lens group is located at a transmission optical path of the spectroscope;
     the imaging interface is located at a tail of the second lens group, and an exit pupil of the second lens group coincides with an interface surface of the imaging interface, for arranging an imaging component;
     the third lens group is located at a reflection optical path of the spectroscope;
     a center of the mirror plane of the reflector coincides with a central axis of the third lens group, and the mirror plane of the reflector is arranged to form an angle of 45° with the central axis, keeping parallel with the spectroscope;
     the fourth lens group is located at a reflection optical path of the reflector;
     the optical fiber interface is arranged at a rear of the fourth lens group, and an end surface of the optical fiber interface coincides with an exit pupil of the fourth lens group; and
   the fourth lens group comprises a crescent convex lens, a planoconvex lens, and another planoconvex lens that are disposed sequentially and coaxially.

* * * * *